(12) United States Patent
Strecker et al.

(10) Patent No.: US 8,955,876 B2
(45) Date of Patent: Feb. 17, 2015

(54) STEERING WHEEL ASSEMBLY FOR A STEERING WHEEL OF A MOTOR VEHICLE

(71) Applicant: Takata AG, Aschaffenburg (DE)

(72) Inventors: Uwe Strecker, Oberbessenbach (DE); Achim Hartlaub, Großwallstadt (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 14/174,631

(22) Filed: Feb. 6, 2014

(65) Prior Publication Data

US 2014/0217711 A1 Aug. 7, 2014

(30) Foreign Application Priority Data

Feb. 7, 2013 (DE) .......................... 10 2013 202 055

(51) Int. Cl.
B60R 21/16 (2006.01)
(52) U.S. Cl.
USPC .......................................................... 280/731
(58) Field of Classification Search
CPC B60Q 5/003; B60R 21/2037; B60R 21/2035; B60R 21/217
USPC .............................................. 280/728.2, 731
See application file for complete search history.

(56) References Cited

U.S. PATENT DOCUMENTS 6,422,594 B2 7/2002 Hasebe
6,464,247 B1 * 10/2002 Laue .......................... 280/728.2
7,823,908 B2 * 11/2010 Matsu et al. ................ 280/728.2
8,256,797 B2 * 9/2012 Sakurai et al. ................ 280/731
2004/0262135 A1 12/2004 Sugimoto
2009/0127811 A1 5/2009 Ahn et al.
2010/0219621 A1 * 9/2010 Sasaki et al. .................. 280/731
2012/0292895 A1 * 11/2012 Schutz .......................... 280/731

FOREIGN PATENT DOCUMENTS

DE 10 2006 005 642 A1 8/2007
DE 10 2007 027 710 A1 1/2009

* cited by examiner

Primary Examiner — Faye M. Fleming
(74) Attorney, Agent, or Firm — Fitch Even Tabin & Flannery LLP

(57) ABSTRACT

The invention relates to a steering wheel assembly for a steering wheel of a motor vehicle, with a gas bag accommodated by a housing, which for the protection of a driver is inflatable by means of a gas generator, with a shiftably mounted carrier for accommodating the housing, which can be positioned in a rest position and at least one deflected position, and with at least one fastening device by means of which the carrier can shiftably be fixed at a steering wheel skeleton of the steering wheel. A spring biasing the carrier into the rest position is associated to the fastening device and the fastening device includes a guiding portion on which the carrier is shiftable against the force of the spring into the deflected position along a main shifting direction, along which the distance between the carrier and the steering wheel skeleton is reduced, wherein between the carrier and the guiding portion a clearance exists in a direction transverse to the main shifting direction. The guiding portion is designed such that the clearance varies along the main shifting direction, so that the clearance is smaller in the rest position of the carrier than in the deflected position of the carrier.

20 Claims, 10 Drawing Sheets

STEERING WHEEL ASSEMBLY FOR A STEERING WHEEL OF A MOTOR VEHICLE

CROSS-REFERENCE TO RELATED APPLICATION

This application claims priority under 35 U.S.C. §119 to German Patent Application No. 10 2013 202 055.4 filed on Feb. 7, 2013, the entire content of which is hereby incorporated herein by reference in its entirety.

FIELD OF THE INVENTION

This invention relates to a steering wheel assembly for a steering wheel of a motor vehicle.

BACKGROUND

Such assembly comprises a gas bag accommodated by a housing, which for the protection of a driver is inflatable by means of a gas generator, and a shiftably mounted carrier for accommodating the housing, which can be positioned at the steering wheel in a rest position and at least one deflected position. The steering wheel assembly in addition comprises at least one fastening device, by means of which the carrier is to be shiftably fixed at a steering wheel skeleton of the steering wheel. There is a spring associated to the fastening device, which biases the carrier into the rest position. Furthermore, the fastening device includes a guiding portion along which the carrier is shiftable into the deflected position against the force of the spring, namely along a main shifting direction along which the distance between the carrier and the steering wheel skeleton is reduced. Between the carrier and the guiding portion a clearance exists in a direction transverse to the main shifting direction, which provides for a free movability of the carrier along the main shifting direction.

With such an assembly it is possible to inflate the gas bag between the driver and the steering wheel by means of the gas generator for the protection of the driver of a motor vehicle in the case of an accident.

The shiftability of such steering wheel assembly together with the associated carrier in a direction, for example in direction of the longitudinal axis of the steering column, can serve to use a cover with which the steering wheel assembly is covered as actuating surface for a horn of the motor vehicle. The same is triggered when the cover is depressed and hence the assembly is shifted along the longitudinal axis of the steering column.

In order not to impede the shiftability of the steering wheel assembly, a gap is left between the edge of the cover of the assembly and an inner trim of a steering wheel pot into which the assembly is inserted. This gap should be as narrow and as uniform as possible. To achieve this, fastening devices are known, which in a non-mounted condition are movable with respect to the carrier of the steering wheel assembly at least along a degree of freedom transversely to the longitudinal axis of the steering column. During the assembly, the steering wheel assembly thereby can be positioned in the steering wheel such that manufacturing tolerances and mounting tolerances of the steering wheel assembly and the steering wheel can be compensated up to a certain extent. For this purpose, for example, a fastening device with cylindrical outer shape is used.

A steering wheel assembly as mentioned above is known from DE 10 2006 005 642 A1.

One difficulty when mounting such steering wheel assembly consists in designing the gap between the edge of the cover and the inner trim of the steering wheel pot, into which the steering wheel assembly is inserted, as narrow and uniform as possible, without jamming or the generation of noise occurring when the steering wheel assembly, or the carrier, is shifted into a deflected position and likewise from a deflected position into the rest position.

SUMMARY

It is a problem underlying the invention that as compared to the prior art both the width of the gap between the edge of the cover and the inner trim of the steering wheel pot is to be reduced and its uniformity is to be increased.

According to an exemplary embodiment of the invention, the guiding portion of the fastening device is designed such that the clearance along the main shifting direction of the carrier varies, so that the clearance is smaller in the rest position of the carrier than in the deflected position of the carrier.

In this way, a particularly accurate positioning of the steering wheel assembly is achieved in particular in the rest position, so that the width of the gap between the cover and the inner trim of the steering wheel pot can further be reduced and its uniformity can further be increased, wherein shifting of the steering wheel assembly, or the carrier, into the deflected position however still is possible without jamming and without generating noise.

In one exemplary embodiment of the invention, the clearance adopts a minimum in the rest position. It thereby is achieved that the position of the carrier, and with the same of the steering wheel assembly, in a direction transverse to the main shifting direction is predetermined more accurately in the rest position than in every deflected position.

In addition, the clearance in the rest position can be reduced to such an extent that it disappears completely.

In a further exemplary embodiment of the invention, the guiding portion of the fastening device tapers in at least one section such that when the carrier is shifted from the rest position into a deflected position, the clearance steadily increases along this section, in order to ensure a free shiftability of the carrier without jamming or generating noise.

For such a design, the fastening device can have a conical outer shape on said section of the guiding portion. Due to this shape, the clearance between the carrier and the guiding portion (steadily and uniformly) increases along the conical section, when the carrier is shifted along the main shifting direction against the force of the spring.

For such a design, the fastening device also can have an outer shape which corresponds to a segment of a spherical surface at said section of the guiding portion. Due to this shape, the clearance between the carrier and the guiding portion also is increased when the carrier is shifted against the force of the spring, without jamming or generating noise. Due to this shape, the carrier in addition has a uniform clearance to the guiding portion, when it is shifted at an angle to the main shifting direction which differs from the angle at which the carrier is located in the rest position.

When during actuation of the horn the cover of the steering wheel assembly is depressed for example on one side only, it can occur that the angle between the carrier of the assembly and the main shifting direction is changed.

According to one exemplary development of the invention, the fastening device of the steering wheel assembly can include a positioning bushing and a fastening means. The positioning bushing includes a first part on which the fastening means supports, and a second part which forms the guiding portion along which the carrier is shiftable. The fastening means, which for example can be a screw, reaches through the positioning bushing and is attached to the steering wheel skeleton, for example screwed into a threaded bore provided for this purpose in the steering wheel skeleton.

The fastening device can be designed such that in a not firmly mounted condition the positioning bushing is movable with respect to the fastening means in at least one direction transverse to the main shifting direction.

This can be achieved for example in that the inside diameter of the positioning bushing is greater than the outside diameter of the fastening means. As a result, in a not firmly mounted condition the former is movable within this difference in size, whereby manufacturing tolerances and mounting tolerances of the steering wheel assembly and the steering wheel can be compensated. In the position in which it compensates best for these tolerances, the positioning bushing can be fixed by means of the fastening means.

The carrier can include at least one opening through which the guiding portion of the fastening device protrudes. Such opening in the carrier can be cylindrical, but other shapes also are conceivable.

Such opening in the carrier can include a guide bushing through which the fastening device extends. The same can be attached to the opening or be integrally molded thereto, for example by plastics injection molding. When the carrier is shifted, such guide bushing guides the carrier along the guiding portion of the fastening device. In addition, it possibly also can serve to limit the length of the portion along which the carrier is shiftable.

In the condition before the assembly, the guide bushing can be connected with the positioning bushing of the fastening device via a film hinge. The positioning bushing thereby already is aligned with the guide bushing at the carrier ready for assembly, whereby the assembly is accelerated, since the working step for aligning the two bushings to each other can be omitted. As soon as the fastening means of the fastening device is attached to the steering wheel, the film hinge breaks open.

According to a further exemplary embodiment, the outer shape of the section of the guiding portion, which is conical or corresponds to the segment of a spherical surface, can extend over only a part of its circumference transversely to the main shifting direction.

The opening in the carrier, in particular the guide bushing, can include a circumferential inner chamfer, which is associated to a conical section of the guiding portion. Such chamfer serves the purpose to provide a guidance of the carrier when the same is shifted between a deflected position and the rest position to a position accurately adjustable during the assembly.

Furthermore, the inner surface of the opening in the carrier, in particular of the guide bushing, can include a portion with enlarged inside diameter, which is associated to a conical section of the guiding portion. The resulting inner edge serves the purpose to provide a guidance of the carrier when the same is shifted between a deflected position and the rest position to a position accurately adjustable during the assembly.

When more than one fastening device is used for fixing the carrier at the steering wheel skeleton, the carrier can be guided along conical sections of the guiding portions of the plurality of fastening devices, when it is shifted between a deflected position and the rest position. Since the carrier is rigid, a relation exists between the respective guidance on the individual guiding portions. By correspondingly positioning the positioning bushings, a particularly accurate position of the carrier in the rest position can be adjusted thereby. This applies in particular in the case in which the outer shape of said section of the guiding portion is conical only at a part of its circumference transversely to the main shifting direction.

According to a further exemplary embodiment, the inner surface of the opening in the carrier, in particular of the guide bushing, has a portion with reduced inside diameter. The same reduces the clearance between the carrier, or the guide bushing, and the guiding portion of the fastening device.

When this portion is designed sufficiently short, for example in a ring-shaped design, racking or jamming of the carrier at the fastening device or the generation of noise when shifting the carrier will not occur, even when the carrier is shifted at an angle to the main shifting direction, which differs from the angle at which it is located in the rest position.

The carrier furthermore can include at least one positioning means with which the carrier can exactly be positioned on holding devices of a positioning unit.

According to a further exemplary embodiment, the carrier includes at least one opening through which after positioning the carrier on the steering wheel skeleton a recess, such as a pin or blind hole, can be incorporated into the steering wheel skeleton.

By the aforementioned embodiments of the invention, manufacturing tolerances and mounting tolerances of the steering wheel assembly and the steering wheel largely are compensated, so that the arrangement of the steering wheel assembly on the steering wheel can be effected more accurately than is ensured by the roundness of the inner trim of the steering wheel pot. Therefore, an aluminum ring can be enclosed at the inner trim, which defines the contour of the inner trim with a sufficiently high accuracy.

In a method for positioning and fixing a steering wheel assembly according to an exemplary embodiment of the invention at a steering wheel skeleton, the steering wheel skeleton initially is arranged on a mounting device. Thereupon, a desired position of the carrier at the steering wheel skeleton is determined, for example by an optical measurement of the center of the inner trim of a steering wheel pot provided for accommodating the steering wheel assembly. The carrier is arranged on a positioning unit, preferably on at least one holding device of the one which reaches through the mounting device and the steering wheel skeleton from below. The holding device for example can be a sprung conical fixing pin and the positioning unit for example a computer-controlled cross slide. Thereupon, the desired position is communicated to the positioning unit, which positions the carrier at the desired position. At this position, the carrier is fixed at the steering wheel skeleton by using at least one fastening device. Thereupon, the housing of the steering wheel assembly is attached to the carrier. Positioning and fixing of the carrier at the desired position here is effected particularly accurately by utilizing the clearance between the carrier and the guiding portion in a direction transverse to the main shifting direction, which in the rest position of the carrier is smaller than in at least one deflected position of the carrier.

A further exemplary aspect of the invention provides for again mounting a carrier which has been demounted at a later time, for example by the service of a workshop, at a desired position in the steering wheel. For this purpose, a recess such as for example a pin or blind hole can be incorporated into the steering wheel skeleton through at least one suitable opening in the carrier after the initial assembly of the carrier at the steering wheel skeleton. For example by means of an alignment pin or tracing gauge it thereby is possible to again mount the carrier at the desired position at the steering wheel skeleton after removal from the steering wheel skeleton.

DETAILED DESCRIPTION

Figure 1:
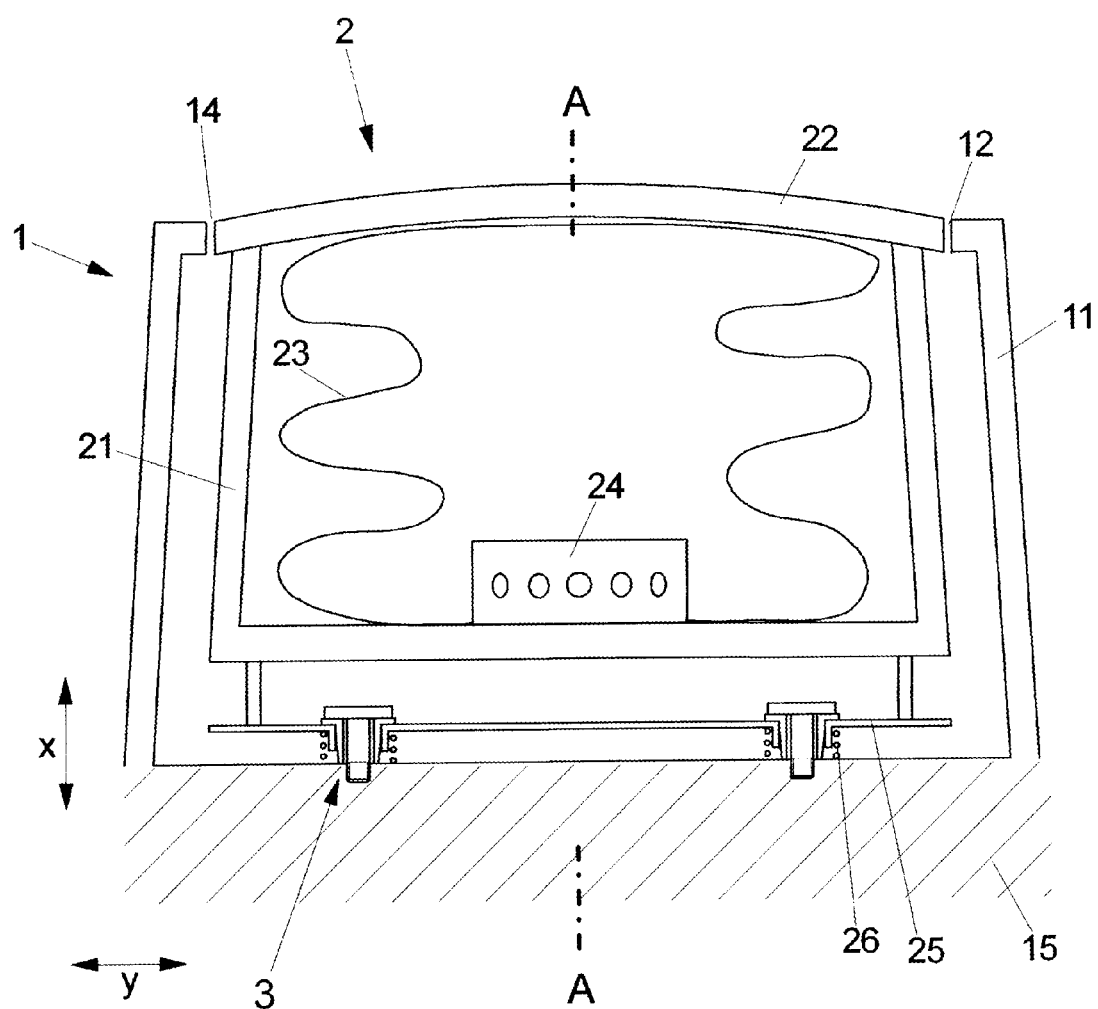
FIG. 1 shows a schematic representation of a steering wheel assembly in cross-section with a carrier attached to a steering wheel skeleton of a steering wheel of a motor vehicle.

FIG. 1 shows a schematic representation of a section of a steering wheel 1 of a motor vehicle, in which a steering wheel assembly 2 is arranged. As components of the steering wheel assembly 2, a gas generator 24 for inflating a gas bag 23, the gas bag 23 in the folded condition, a housing 21 which accommodates the gas generator 24 and the gas bag 23, as well as a carrier 25 for attachment of the steering wheel assembly 2 to the steering wheel skeleton 15 are shown.

The steering wheel assembly 2 is arranged in a steering wheel pot 11 provided for this purpose at the steering wheel 1 of the motor vehicle and attached to the steering wheel skeleton 15 via the carrier 25 by means of at least one fastening device 3 (in FIG. 1 two fastening devices 3 are shown by way of example). The cover 22 of the housing 21 facing the driver of the motor vehicle can be used as actuating surface for a horn of the motor vehicle. For this purpose, the steering wheel assembly 2 is shiftable along a main shifting direction x, along which the distance between the carrier 25 and the steering wheel skeleton 15 is reduced, which becomes possible by a shiftably mounted attachment of the carrier 25 to the steering wheel skeleton 15. In general, but not necessarily, the main shifting direction x can coincide with the longitudinal axis of the steering column A Between the edge of the cover 22 of the housing 21 facing the driver and an inner trim 12 of the steering wheel pot 11 a gap 14 must be left, in order to ensure the shiftability of the steering wheel assembly 2.

Figure 2:
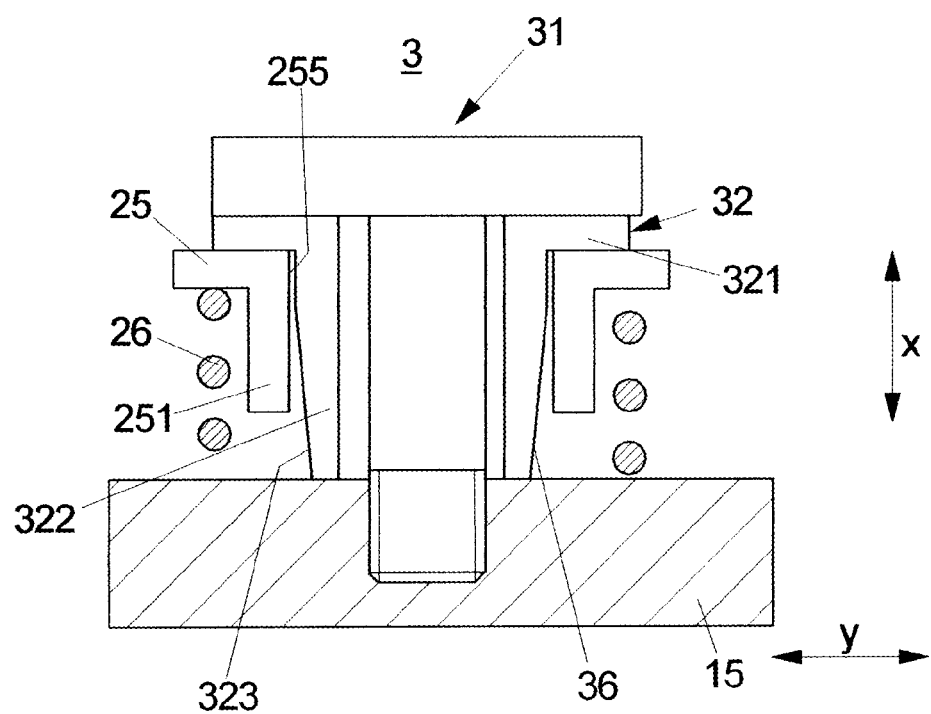
FIG. 2 shows a fastening device of the steering wheel assembly of FIG. 1 according to a first exemplary embodiment.

FIG. 2 shows the fastening device 3 of the steering wheel assembly 2 of FIG. 1 for shiftably mounting the carrier 25 at the steering wheel skeleton 15 in a first exemplary embodiment. The fastening device protrudes through an opening 255 in the carrier, to which a guide bushing 251 is integrally molded, and includes a fastening means 31, which for example can be a screw, and a positioning bushing 32. The fastening means 31 reaches through the positioning bushing 32 and is attached to the steering wheel skeleton 15.

The guide bushing 251 serves the guidance of the carrier 25 along a guiding portion 36 of the fastening device 3. In addition, it can adopt the function to limit the maximum displacement of the carrier 25 along the main shifting direction x. It is, however, also conceivable that the fastening device 3 extends directly through the opening 255 in the carrier and that a guide bushing 251 is omitted.

The positioning bushing 32 includes a first part 321 on which the fastening means 31 supports, and a second part 322 which forms the guiding portion 36 along which the carrier 25 is shiftable.

The inside diameter of the positioning bushing 32 is greater than the outside diameter of the fastening means 31. In a not firmly mounted condition, it thereby is movable within this difference in size, whereby manufacturing tolerances and mounting tolerances of the steering wheel assembly 2 and the steering wheel 1 can be compensated. In the position in which it compensates best for these tolerances, the positioning bushing 32 can be fixed by means of the fastening means 31.

FIG. 2 shows the carrier 25 in the rest position into which it is biased against the first part 321 of the positioning bushing by the force of a spring 26 associated to the fastening device 3.

It is also conceivable that the positioning bushing 32 has no first part 321, and that the part of the fastening means 31 supporting on the positioning bushing 32 adopts its function.

According to FIG. 2, the guiding portion 36 of the positioning bushing 32 has a conical outer shape at one section. Due to this shape, the clearance between the carrier 25 and the guiding portion 36 (steadily and uniformly) increases along the conical section 323, when the carrier 25 is shifted along the main shifting direction x against the force of the spring 26.

Figure 3:
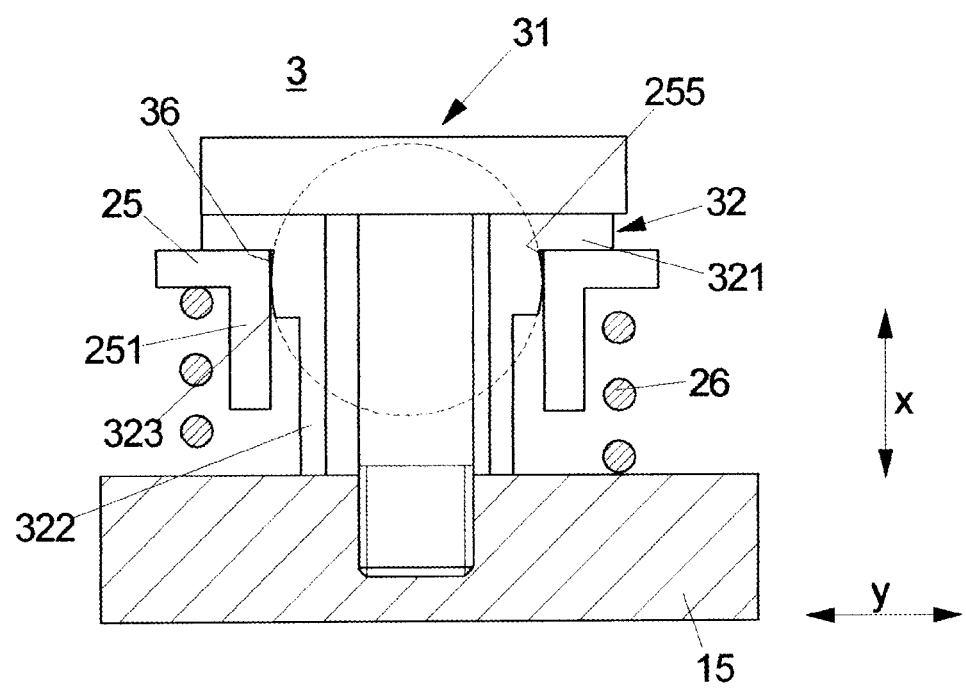
FIG. 3 shows the fastening device of the steering wheel assembly of FIG. 1 according to a second exemplary embodiment.

FIG. 3 shows the fastening device 3 of the steering wheel assembly in a second exemplary embodiment, in which in a section 323 of the guiding portion 36 the positioning bushing 32 of the fastening device 3 has an outer shape which corresponds to the segment of a spherical surface, instead of a conical outer shape. The corresponding circular contour of the positioning bushing 32 in the illustrated cross-section is emphasized by a dashed circle.

Moreover, the exemplary embodiment of FIG. 3 corresponds with the arrangement of FIG. 2.

Figure 4A:
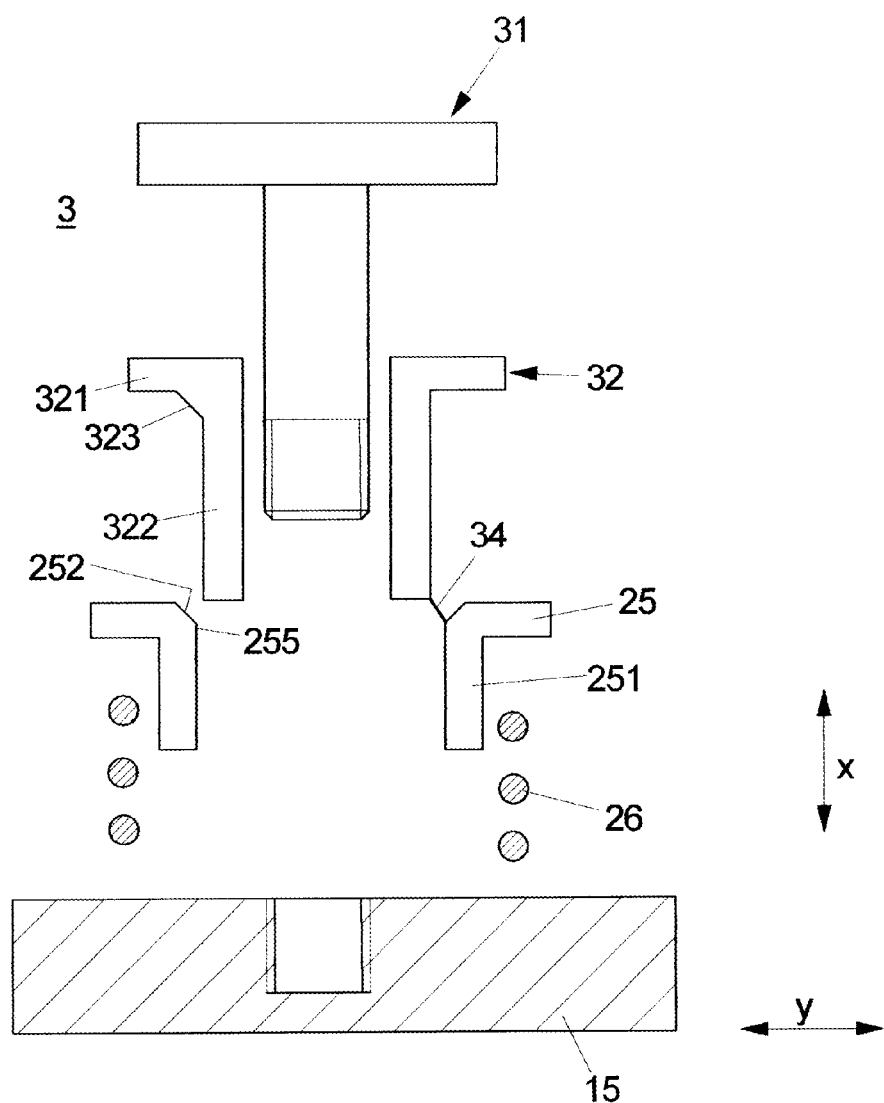
FIG. 4A shows the fastening device of the steering wheel assembly according to a third exemplary embodiment in a first mounting step.
Figure 4B:
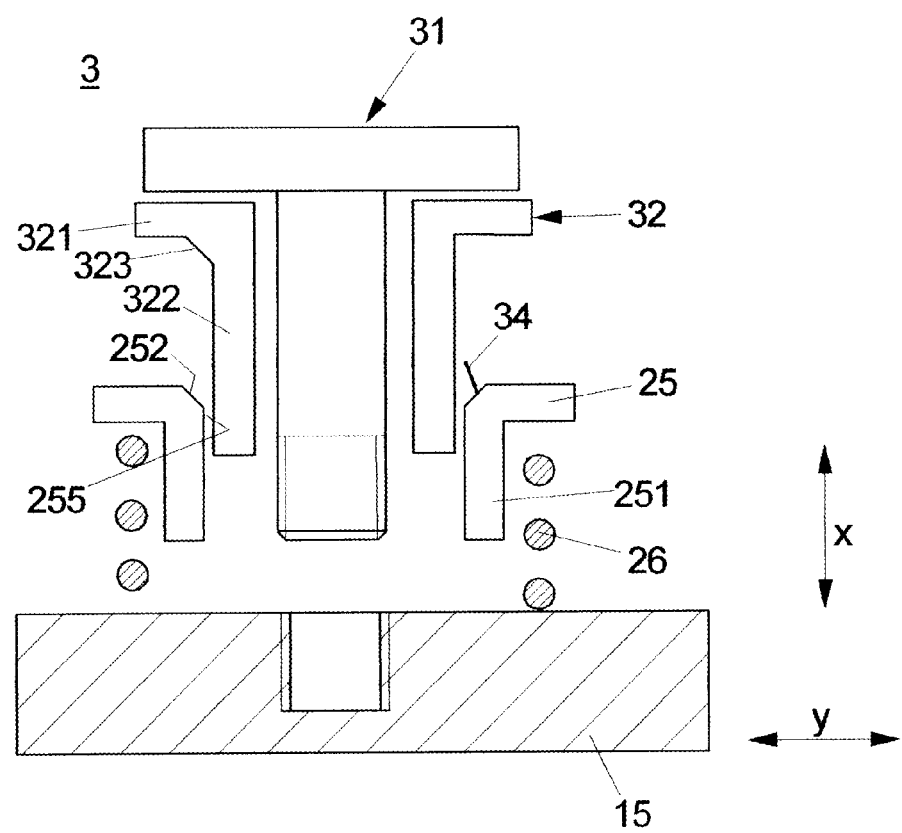
FIG. 4B shows the fastening device of the steering wheel assembly according to FIG. 4A in a second mounting step.
Figure 4C:
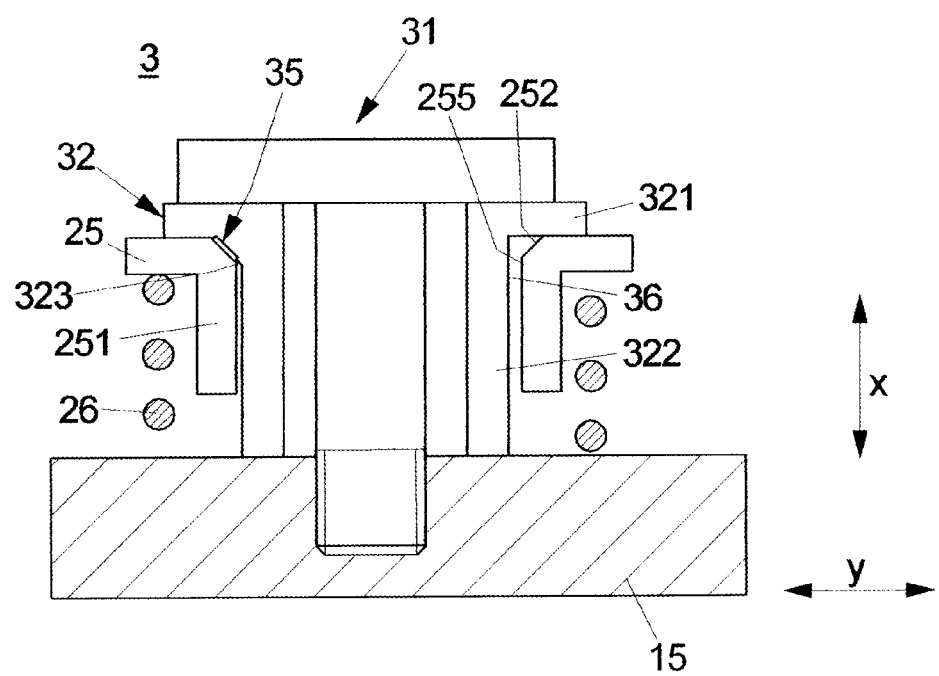
FIG. 4C shows the fastening device of the steering wheel assembly according to FIG. 4A in the condition after the assembly.

FIG. 4A to FIG. 4C show a third exemplary embodiment of the invention, according to which the guide bushing 251 has a circumferential inner chamfer 252, which is associated to a conical section 323 of the guiding portion 36. Preferably, the conical section 323 does not extend over the entire circumference of the guiding portion, but only over a part thereof, as is shown in FIGS. 4A to 4C.

FIG. 4A shows a first mounting step, in which the positioning bushing 32 and the guide bushing 251 are connected with each other (premounted) via a film hinge 34. The spring 26 is designed as annular spring through which the guide bushing 251 integrally molded to the carrier 25 is pushed. In this condition, the fastening means 31 does not yet contact the positioning bushing 32, but is pushed into the same.

As soon as in a second mounting step the fastening means 31 is moved further in direction of the steering wheel skeleton 15, the film hinge 34 breaks open, as shown in FIG. 4B.

FIG. 4C shows the fastening device 3 of this exemplary embodiment after the assembly. Resting against the positioning bushing 32, the carrier 25 is biased into the rest position by the force of the spring 26.

FIG. 4C in addition shows a bearing region 35, in which the carrier 25, or the guide bushing 251, rests against the conical section 323 of the guiding portion 36 in the rest position.

Figure 5:
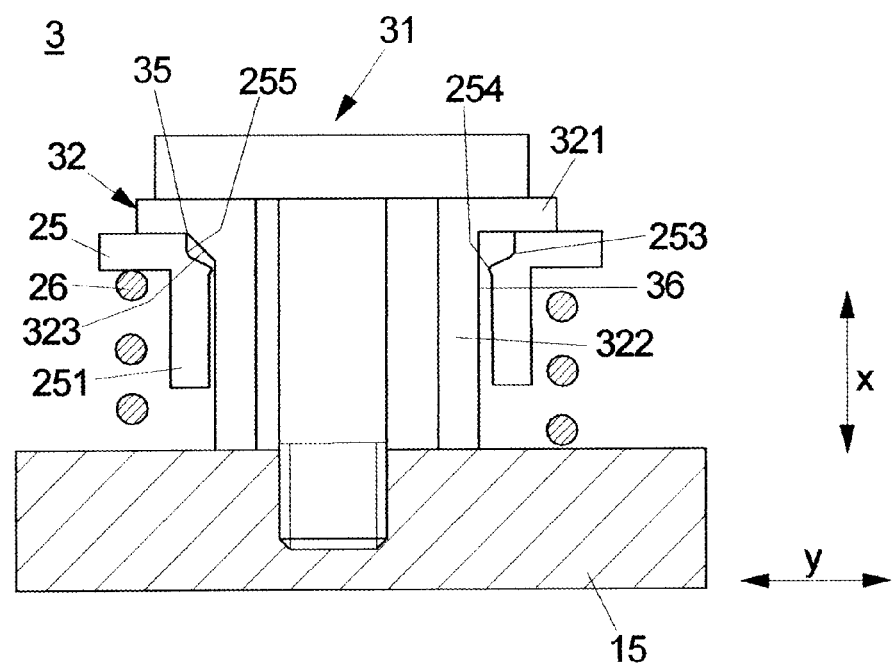
FIG. 5 shows the fastening device of the steering wheel assembly of FIG. 1 according to a fourth exemplary embodiment.

FIG. 5 shows a fourth exemplary embodiment of the steering wheel assembly 2, in which the inner surface of the guide bushing 251 includes a portion 253 with enlarged inside diameter, which is associated to a conical section 323 of the guiding portion 36. The inner edge of the guide bushing 251 formed by the enlarged inside diameter serves the purpose to provide a guidance of the carrier 25 when the same is shifted between a deflected position and the rest position to a position accurately adjustable during the assembly. In addition, a bearing region 35 is shown, in which the carrier 25, or the guide bushing 251, rests against the conical section 323 of the guiding portion 36 in the rest position.

Like in FIGS. 4A to 4C, the conical section 323 shown in FIG. 5 does not extend over the entire circumference of the guiding portion, but only over a part thereof. An advantage of this configuration consists in that when shifted from the rest position into a deflected position, the carrier 25 immediately leaves the bearing region 35 and is freely shiftable.

Furthermore, FIG. 5 shows a portion 254 on the inner surface of the guide bushing 251 with reduced inside diameter. This reduces the clearance between the guide bushing 251 and the guiding portion 36 of the fastening device 3. In FIG. 5, this portion is shown in a ring-shaped configuration. This feature can be combined with any other exemplary embodiment of the invention.

Figure 6:
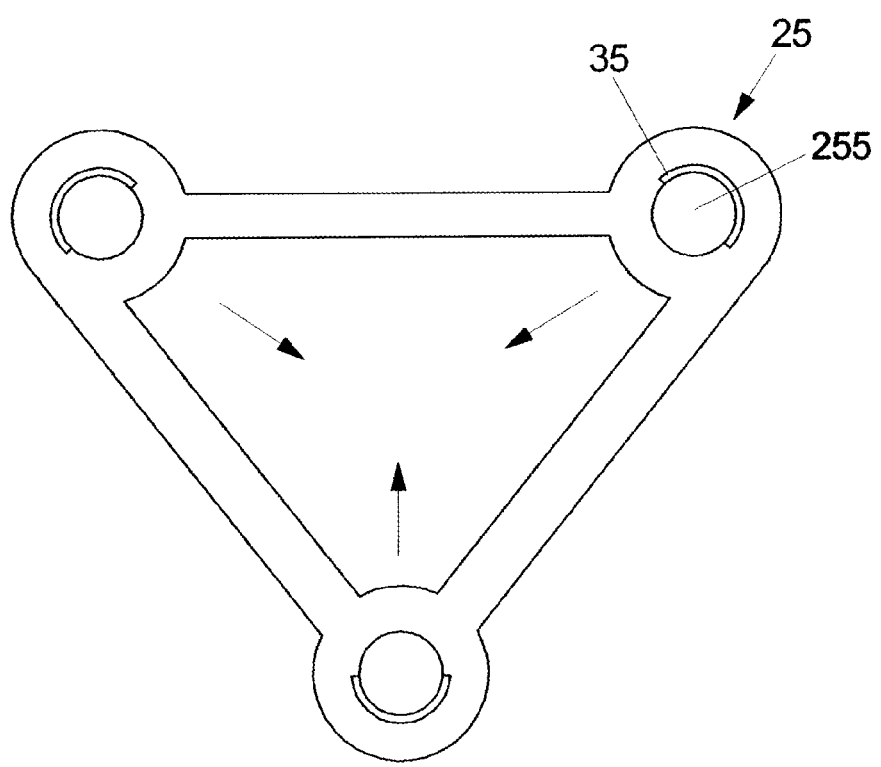
FIG. 6 shows a carrier of the steering wheel assembly of FIG. 1.

FIG. 6 shows an exemplary embodiment of the carrier 25 of the invention with three openings 255, which each are provided for a fastening means 3. In addition, a bearing region 35 is shown for each of the openings 255, as it is obtained in the exemplary embodiments of FIG. 4C and FIG. 5 when the positioning bushings 32 are positioned correspondingly, when the carrier 25 is guided on a conical section 323 of the guiding portion 36 during a displacement between a deflected position and the rest position. Corresponding to the position adjustable during the assembly, a component of movement transversely to the main shifting direction x or a rotary movement about the axis of the main shifting direction x can be superimposed on the guidance. The direction of the component of movement at each individual opening 255 in the carrier 25, corresponding to the bearing regions 35, is shown with arrows in FIG. 6. There is obtained a centering of the carrier 25 in the steering wheel pot 11.

By the present invention, manufacturing tolerances and mounting tolerances of the steering wheel assembly 2 and the steering wheel 1 largely are compensated, so that the arrangement of the steering wheel assembly 2 on the steering wheel 1 can be effected more accurately than is ensured by the roundness of the inner trim 12 of the steering wheel pot 11. Therefore, an aluminum ring 13 can be enclosed at the inner trim 12, which defines the contour of the inner trim with a sufficiently high accuracy.

Figure 7:
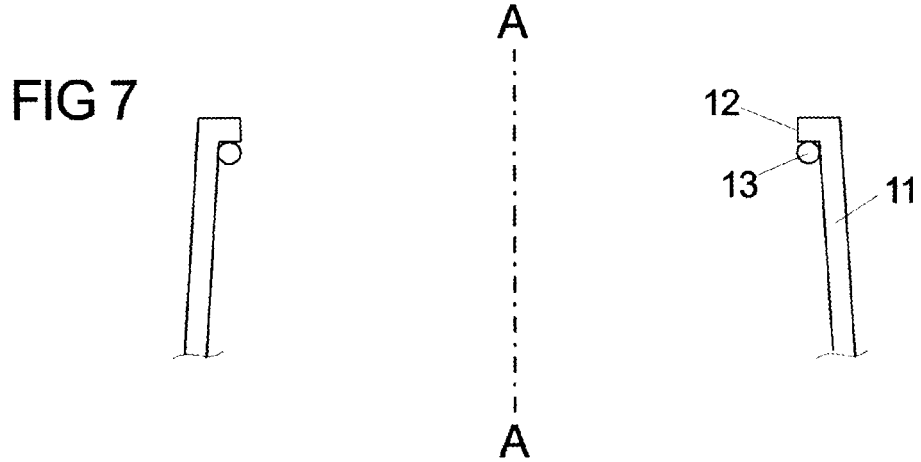
FIG. 7 shows an inner trim of a steering wheel pot of FIG. 1, in which the steering wheel assembly can be arranged.

The viewing direction in FIG. 7 corresponds to the one of FIG. 1, and the longitudinal axis A of the steering column is indicated analogously.

Figure 8:
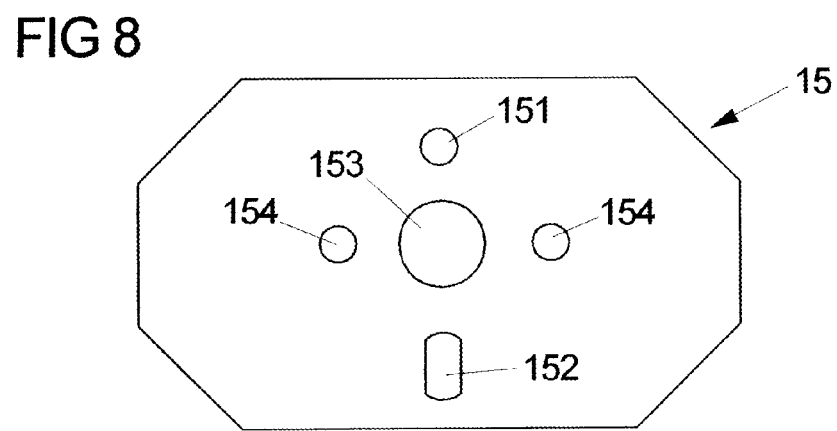
FIG. 8 shows a steering wheel skeleton for arrangement of a steering wheel assembly of FIG. 1.

FIG. 8 shows a section of the steering wheel skeleton 15 before the arrangement of the steering wheel assembly 2 along an axis which extends vertically through the steering bushing 153. The positioning openings 154 serve for positioning the carrier 25, and a round hole 151 and an oblong hole 152 serve for positioning the steering wheel on a mounting unit 4. The latter can be designed as bushings integrally molded to the steering wheel skeleton 15.

Figure 9:
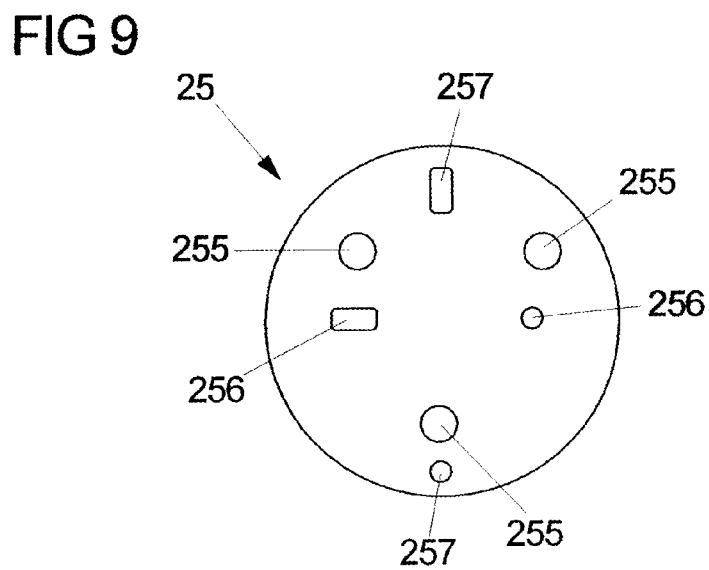
FIG. 9 shows a carrier for arrangement on a steering wheel skeleton.

FIG. 9 shows the carrier 25 of FIG. 6 in a further exemplary embodiment with three openings 255, which each are provided for a fastening means 3. Furthermore, positioning means 256 are provided, with which the carrier 25 can exactly be positioned on holding devices 43 of a positioning unit 42. Preferably, the positioning means 256 are round and/or oblong holes.

FIG. 9 in addition shows openings 257 through which after positioning the carrier 25 on the steering wheel skeleton 15 a recess each can be incorporated into the steering wheel skeleton 15 during the assembly of the steering wheel. For example by means of an alignment pin or tracing gauge it thereby is possible to again mount the carrier at the desired position in the steering wheel after removal from the steering wheel skeleton, without a mounting unit 4 being required. The recess preferably is designed as pin or blind hole and incorporated into the steering wheel skeleton by drilling. The openings 257 also can be designed as round or oblong hole.

Preferably, two positioning means 256 and two openings 257 each are provided in a carrier 25, each designed as round hole and as oblong hole.

Figure 10:
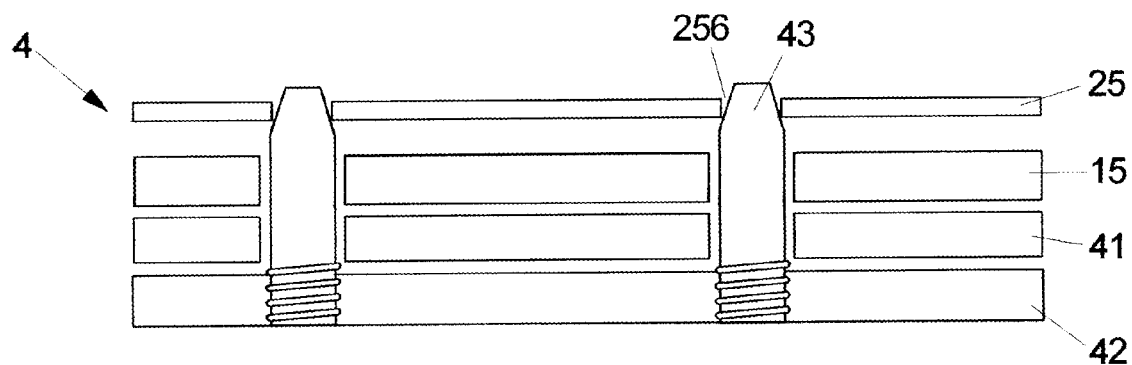
FIG. 10 shows a mounting unit for positioning the carrier of FIG. 6 on the steering wheel skeleton of FIG. 8.

FIG. 10 shows the mounting unit 4 for positioning and fixing the steering wheel assembly 2 at the steering wheel skeleton 15 in a lateral view in cross-section. The steering wheel skeleton 15 is arranged on the mounting device 41, such as for example a mounting table, the carrier 25 is arranged on holding devices 43, such as for example conical sprung fixing pins, of the positioning unit 42, which reaches from below through the mounting device 41 and the steering wheel skeleton 15. Such positioning unit 42 for example can be a CNC cross slide.

What is claimed is:

1. A steering wheel assembly for a steering wheel of a motor vehicle, comprising
a gas bag accommodated by a housing, which for the protection of a driver is inflatable by means of a gas generator,
a shiftably mounted carrier for accommodating the housing, which can be positioned in a rest position and at least one deflected position, and
at least one fastening device, by means of which the carrier is to be shiftably fixed at a steering wheel skeleton of the steering wheel, wherein a spring biasing the carrier into the rest position is associated to the fastening device and the fastening device includes a guiding portion on which the carrier is shiftable against the force of the spring into the deflected position along a main shifting direction, along which the distance between the carrier and the steering wheel skeleton is reduced, wherein between the carrier and the guiding portion a clearance exists in a direction transverse to the main shifting direction,
wherein the guiding portion is designed such that the clearance varies along the main shifting direction, so that the clearance is smaller in the rest position of the carrier than in the deflected position of the carrier.

2. The steering wheel assembly according to claim 1, wherein the clearance adopts a minimum in the rest position of the carrier.

3. The steering wheel assembly according to claim 1, wherein the clearance disappears in the rest position of the carrier.

4. The steering wheel assembly according to claim 1, wherein the guiding portion of the fastening device tapers in at least a section such that when shifting the carrier from the rest position into a deflected position, the clearance increases along that section.

5. The steering wheel assembly according to claim 4, wherein at the section the guiding portion of the fastening device has an outer shape which is conical or corresponds to the segment of a spherical surface.

6. The steering wheel assembly according to claim 1, wherein the fastening device includes a positioning bushing which is attached to the steering wheel skeleton with a fastening means and which has a first part on which the fastening means supports, as well as a second part which forms the guiding portion along which the carrier is shiftable.

7. The steering wheel assembly according to claim 6, wherein in a not firmly mounted condition the positioning bushing is movable with respect to the fastening means in at least one direction transverse to the main shifting direction.

8. The steering wheel assembly according to claim 1, wherein the carrier includes at least one opening through which the guiding portion extends.

9. The steering wheel assembly according to claim 8, wherein at the opening of the carrier a guide bushing is provided, which guides the carrier when the same is shifted along the guiding portion of the fastening device.

10. The steering wheel assembly according to claim 9, wherein in the condition before the assembly the guide bushing is connected with the positioning bushing via a film hinge.

11. The steering wheel assembly according to claim 5, wherein the outer shape of the section, which is conical or corresponds to the segment of a spherical surface, extends over only a part of its circumference transversely to the main shifting direction.

12. The steering wheel assembly according to claim 5, wherein the carrier includes at least one opening through which the guiding portion extends and the opening in the carrier includes a circumferential inner chamfer which is associated to a conical section of the guiding portion.

13. The steering wheel assembly according to claim 5, wherein the carrier includes at least one opening through which the guiding portion extends and the inner surface of the opening in the carrier includes a portion with enlarged inside diameter, which is associated to a conical section of the guiding portion.

14. The steering wheel assembly according to claim 8, wherein the inner surface of the opening in the carrier includes a portion with reduced inside diameter.

15. The steering wheel assembly according to claim 1, wherein the carrier includes at least one positioning means with which the carrier can be positioned on holding devices of a positioning unit.

16. The steering wheel assembly according to claim 1, wherein the carrier includes at least one opening through which a recess can be incorporated into the steering wheel skeleton after positioning the carrier on the steering wheel skeleton.

17. A steering wheel for a motor vehicle, comprising
a steering wheel skeleton, and
a steering wheel assembly according to claim 1, which is attached to the steering wheel skeleton by means of the at least one fastening device.

18. The steering wheel according to claim 17, wherein at an inner trim of a steering wheel pot, into which the steering wheel assembly is inserted, an aluminum ring is enclosed.

19. A method for mounting a steering wheel assembly according to claim 1 on a steering wheel skeleton, comprising the following steps:
arranging the steering wheel skeleton on a mounting device,
determining a desired position of the carrier at the steering wheel skeleton,
arranging the carrier on a positioning unit,
positioning the carrier in the desired position at the steering wheel skeleton by using the positioning unit,
fixing the carrier at the steering wheel skeleton by using at least one fastening device such that in the fixed condition the carrier is shiftable along the main shifting direction, in that a spring biasing the carrier into the rest position is associated to the fastening device and the fastening device includes a guiding portion on which the carrier is shiftable against the force of the spring into the deflected position along a main shifting direction along which the distance between the carrier and the steering wheel skeleton is reduced, wherein between the carrier and the guiding portion a clearance exists in a direction transverse to the main shifting direction, and the guiding portion is designed such that the clearance varies along the main shifting direction, so that the clearance is smaller in the rest position of the carrier than in the deflected position of the carrier,
attaching the housing to the carrier.

20. The method according to claim 19, wherein after positioning the carrier at the steering wheel skeleton, a recess is incorporated into the steering wheel skeleton through at least one opening in the carrier.

* * * * *